US012719275B2

(12) United States Patent
Faustine et al.

(10) Patent No.: US 12,719,275 B2
(45) Date of Patent: Aug. 25, 2026

(54) SYSTEM FOR MINIMIZING VOLTAGE VIOLATIONS ARISING FROM DISTRIBUTED ENERGY RESOURCE (DER) USE IN A POWER DISTRIBUTION GRID

(71) Applicant: EATON INTELLIGENT POWER LIMITED, Dublin (IE)

(72) Inventors: Anthony Faustine, Citywest (IE); Kanika Sharma, Dublin (IE); S. Inder Preet, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/248,889

(22) Filed: Jun. 25, 2025

(65) Prior Publication Data

US 2025/0392124 A1 Dec. 25, 2025

Related U.S. Application Data

(60) Provisional application No. 63/663,797, filed on Jun. 25, 2024.

(51) Int. Cl.
*H02J 3/38* (2026.01)
*H02J 3/00* (2026.01)
(Continued)

(52) U.S. Cl.
CPC .......... *H02J 3/00125* (2020.01); *H02J 3/003* (2020.01); *H02J 3/17* (2026.01); *H02J 3/381* (2013.01); *H02J 2103/30* (2026.01)

(58) Field of Classification Search
CPC .......... H02J 3/00125; H02J 3/003; H02J 3/17; H02J 3/381; H02J 2103/30
(Continued)

(56) References Cited

U.S. PATENT DOCUMENTS

| | | | | |
|---|---|---|---|---|
| 8,577,510 | B2 * | 11/2013 | Powell | G01D 4/002 700/286 |
| 9,519,299 | B2 | 12/2016 | Daley | |
| 9,553,453 | B2 * | 1/2017 | Tyler | H02J 3/00 |

OTHER PUBLICATIONS

P. Yu, C. Wan, Y. Song and Y. Jiang, "Distributed Control of Multi-Energy Storage Systems for Voltage Regulation in Distribution Networks: A Back-and-Forth Communication Framework," in IEEE Transactions on Smart Grid, vol. 12, No. 3, pp. 1964-1977, May 2021, doi: 10.1109/TSG.2020.3026930, 14 pp.

(Continued)

*Primary Examiner* — Michael R. Fin
(74) *Attorney, Agent, or Firm* — Eckert Seamans Cherin & Mellott, LLC

(57) ABSTRACT

To address voltage violations introduced by the extensive integration of DERs into distribution power grids, a voltage control system is provided to maintain the proper voltage levels essential for a stable and reliable distribution power grid. The voltage control system uses a two-stage approach. In the first stage, the system regulates voltage at the local level, typically at the consumer's premises. Local level control relies on the flexibility of various DER systems, such as EV charging systems, photovoltaic systems, and battery energy storage systems, which can be controlled and adjusted to maintain stable voltage levels within acceptable limits. In the second stage, distributed control is implemented by coordinating distributed voltage-regulating devices such as PV inverters, OLTCs, and capacitor banks to control network voltage in real time. The two-stage voltage control system minimizes voltage violations, reduces energy consumption costs, and maintains the stability and reliability of the distributed power grid.

20 Claims, 3 Drawing Sheets

(51) Int. Cl.
*H02J 3/001* (2026.01)
*H02J 3/17* (2026.01)
*H02J 103/30* (2026.01)

(58) Field of Classification Search
USPC ........................................................... 307/18
See application file for complete search history.

(56) References Cited

OTHER PUBLICATIONS

R. R. Jha, A. Dubey, C.-C. Liu and K. P. Schneider, "Bi-Level Volt-VAR Optimization to Coordinate Smart Inverters With Voltage Control Devices," in IEEE Transactions on Power Systems, vol. 34, No. 3, pp. 1801-1813, May 2019, doi: 10.1109/TPWRS.2018.2890613, 13 pp.

William Murray, Marco Adonis, Atanda Raji, "Voltage control in future electrical distribution networks," Renewable and Sustainable Energy Reviews, vol. 146, 2021, 13 pp.

* cited by examiner

SYSTEM FOR MINIMIZING VOLTAGE VIOLATIONS ARISING FROM DISTRIBUTED ENERGY RESOURCE (DER) USE IN A POWER DISTRIBUTION GRID

CROSS REFERENCE TO RELATED APPLICATIONS

This application claims priority to U.S. Provisional Patent Application Ser. No. 63/663,797, filed on Jun. 25, 2024, titled "INTEGRATED VOLTAGE CONTROL AND FLEXIBILITY OF POWER DISTRIBUTION SYSTEM WITH LIMITED OBSERVABILITY", the disclosure of which is incorporated herein by reference.

FIELD OF THE INVENTION

The disclosed concept relates generally to voltage control in power distribution grids, and in particular, to systems and methods for preventing and minimizing voltage violations in power distribution grids that include distributed energy resources.

BACKGROUND OF THE INVENTION

Distributed energy resources (DERs) have become widely used as the push for using renewable energy sources has increased. One of the primary challenges introduced by the extensive integration of DERs into power distribution grids is voltage violations, such as over-voltage or under-voltage conditions. Voltage violations can damage equipment, disrupt power supply, and even pose safety risks. Thus, maintaining proper voltage levels is essential for a stable and reliable distribution power grid.

In power distribution systems that include significant use of DERs, it is not feasible to implement the same voltage-control strategies that are used to prevent or manage voltage violations in power distribution systems that do not include significant use of DERs. Mechanical tools such as on-load tap changers (OLTCs) and capacitor banks (CBs) are traditionally used to manage voltage irregularities at the distribution level, but these mechanical tools exhibit slow response speeds and long intervals between adjustments, which may not on their own effectively mitigate the rapid voltage violations induced by DERs. Alternative control methods, such as those that rely on optimal power flow, necessitate having comprehensive information about the low-voltage (LV) network, which is typically unavailable to the utility.

The present invention thus provides a solution for preventing and minimizing voltage violations in distribution power grids that include DERs.

SUMMARY OF THE INVENTION

These needs, and others, are met by embodiments of a voltage control system and voltage control method disclosed herein. The disclosed voltage control system and method utilize a two-stage approach. The first stage focuses on regulating voltage at the local level, typically at the end user's premises, and the second stage focuses on regulating voltage at the distributed level. Regulating voltage at the local level in the first stage relies on the flexibility of the various types of DER systems, such as electric vehicle (EV) charging systems, photovoltaic (PV) systems, and battery energy storage systems (BESS), which can be controlled and adjusted to help maintain stable voltage levels within acceptable limits. Distributed control in the second stage provides real-time voltage control by coordinating distributed voltage-regulating devices such as PV inverters, OLTCs and capacitor banks.

In accordance with one aspect of the disclosed concept, a voltage control system for controlling voltage in a power distribution network having a localized area is provided. The localized area comprises a secondary substation and a plurality of end users that receive power from the secondary substation via a plurality of secondary feeders. The localized area includes AMI devices that track energy consumption of each end user in the plurality of end users. The voltage control system is a controller system and comprises a localized voltage control manager and a distributed voltage control manager. The localized voltage control manager and the distributed voltage control manager are both configured to communicate with the secondary substation and the AMI devices. The localized voltage control manager and distributed voltage control manager are configured to obtain energy consumption data and PQV data from the secondary substation and the AMI devices. The energy consumption data reflects actual past energy consumption of each end user in the localized area and the PQV data reflects quantification of active power P, reactive power Q, and voltage V actually input to and output by the substation. The localized voltage control manager and the distributed voltage control manager are configured to generate a day-ahead forecast using the energy consumption data and the PQV data. The localized voltage control manager is configured to create a load shifting plan for each end user based on the energy consumption data and based on the day-ahead forecast, with the load shifting plan providing a load use schedule under which each end user can use various loads without creating voltage violations. The distributed voltage control manager is configured to create a day-ahead dispatch for distribution level voltage control devices based on the day-ahead forecast and the load shifting plan, the day-ahead dispatch being designed to minimize voltage fluctuations from utility-set voltage requirements for the power distribution network, the day-ahead dispatch also prescribing parameters for how each of the distribution level voltage control devices should be operated. When the day-ahead dispatch is executed, the distributed voltage control manager is configured to dynamically adapt operation of the distribution level voltage control devices in order to adhere as closely as possible to the day-ahead dispatch, based on real-time data and current network conditions in the power distribution network.

In accordance with another aspect of the disclosed concept, a method for controlling voltage in a power distribution network having a localized area is provided. The localized area comprises a secondary substation and a plurality of end users that receive power from the secondary substation via a plurality of secondary feeders. The localized area includes AMI devices that track energy consumption of each end user in the plurality of end users. The method comprises: providing a voltage control system that is a controller system, the voltage control system including a localized voltage control manager and a distributed voltage control manager, the localized voltage control manager and the distributed voltage control manager being configured to communicate with the secondary substation and the AMI devices; obtaining, with the localized voltage control manager and distributed voltage control manager, energy consumption data and PQV data from the secondary substation and the AMI devices, the energy consumption data reflecting actual past energy consumption of each end user in the localized area and the PQV data reflecting quantification of active power P, reactive power Q, and voltage V actually input to and output by the substation; generating, with the localized voltage control manager and the distributed voltage control manager, a day-ahead forecast using the energy consumption data and the PQV data; generating, with the localized voltage control manager, a load shifting plan for each end user based on the energy consumption data and based on the day-ahead forecast, with the load shifting plan providing a load use schedule under which each end user can use various loads without creating voltage violations; generating, with the distributed voltage control manager, a day-ahead dispatch for distribution level voltage control devices based on the day-ahead forecast and the load shifting plan, the day-ahead dispatch being designed to minimize voltage fluctuations from utility-set voltage requirements for the power distribution network, the day-ahead dispatch also prescribing parameters for how each of the distribution level voltage control devices should be operated; executing the day-ahead dispatch with the distributed voltage control manager; and dynamically adapting, with the distributed voltage control manager, operation of the distribution level voltage control devices in order to adhere as closely as possible to the day-ahead dispatch, based on real-time data and current network conditions in the power distribution network.

BRIEF DESCRIPTION OF THE DRAWINGS

A full understanding of the invention can be gained from the following description when read in conjunction with the accompanying drawings in which.

DETAILED DESCRIPTION OF THE INVENTION

Figure 1:
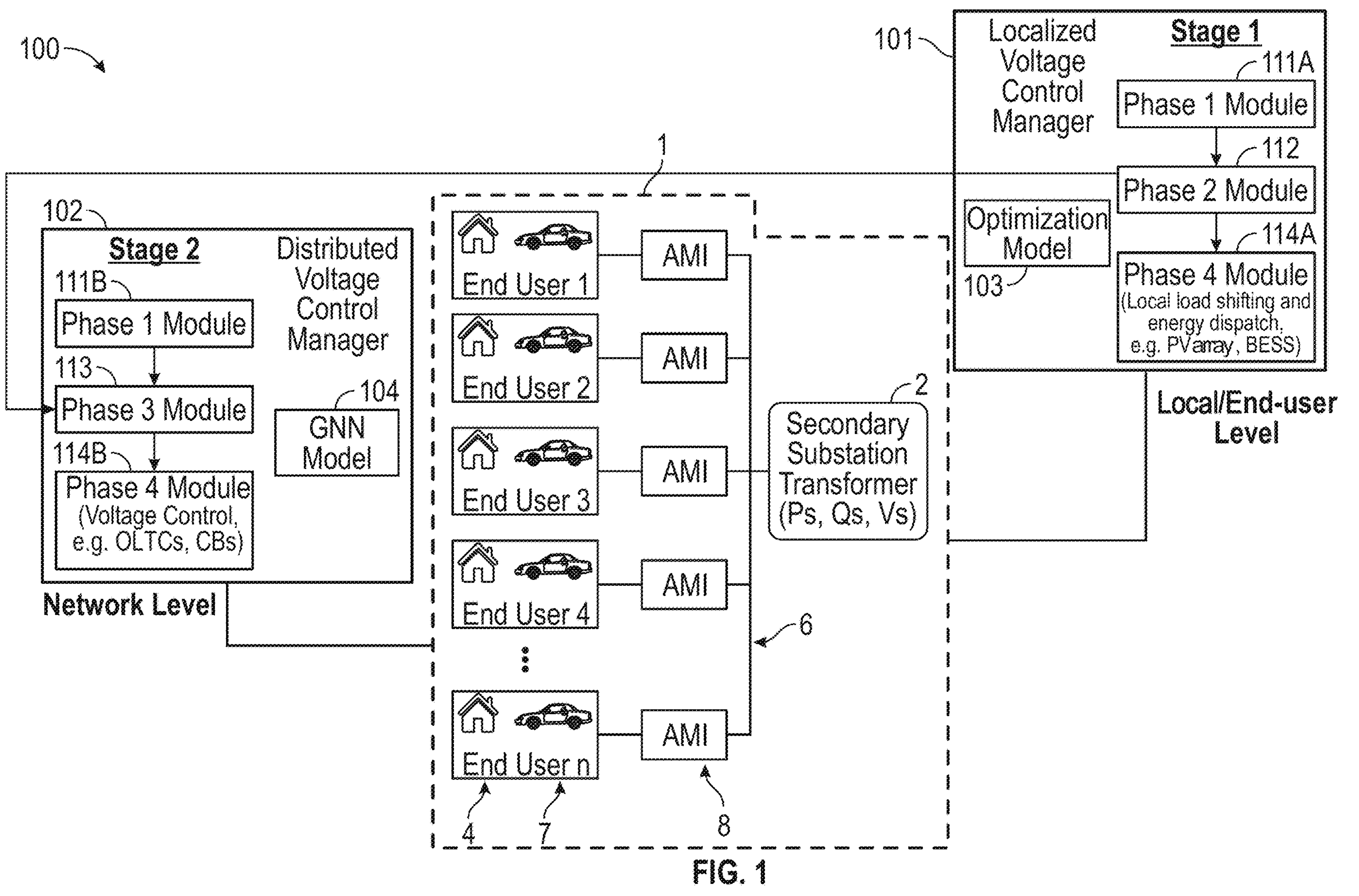
FIG. 1 is a block diagram depicting a two-stage distributed voltage control system, in accordance with an exemplary embodiment of the disclosed concept.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "controller" shall mean a programmable analog and/or digital device that can store, retrieve, and process data; a microprocessor; a microcontroller; a microcomputer; a central processing unit; or any suitable processing device or apparatus.

Many new techniques of voltage control rely on communication schemes to mitigate grid instability problems. In contrast, the innovative system and method disclosed herein harness the flexibility of end users' power usage patterns. In particular, the disclosed system and method utilize a two-stage approach to minimize voltage violations by integrating voltage control at the network level with the ability to adapt DER consumption patterns among end-users. The first stage focuses on regulating voltage at the local level, which is typically at the consumer's premises, and the second stage focuses on regulating voltage at the distributed level. Regulating voltage at the local level in the first stage relies on the flexibility of the various types of DER systems, such as electric vehicle (EV) charging systems, photovoltaic (PV) systems, and battery energy storage systems (BESS), which can be controlled and adjusted to help maintain stable voltage levels within acceptable limits. Distributed control in the second stage provides real-time voltage control by coordinating distributed voltage-regulating devices such as PV inverters, OLTCs and capacitor banks. The primary objectives of the two-stage distributed control system are to minimize voltage violations, reduce energy consumption costs for the end-user, and maintain the stability and reliability of the distributed power grid.

It should be noted that system and method disclosed herein utilize advanced metering infrastructure (AMI), which is a two-way communication system comprising both hardware and software used to collect detailed metering information throughout a utility's service industry. AMI is a metering system that is typically automated and allows real time, on-demand interrogations with metering endpoints. AMI records customer electricity consumption regularly (e.g. hourly or more frequently) and transmits the recorded customer consumption information over a communication network to a central collection point, either on request or on a defined schedule basis. Communication in an AMI network is preferably two-way, enabling either utilities, customers, or other parties to initiate communication. An AMI system is capable of providing usage information to utilities, electricity customers, and other parties regularly (e.g. on at least a daily basis) and enables all parties to participate in and/or provide demand response products, services and programs. The information that can be provided via AMI includes: cumulative kWh usage, daily kWh usage, peak kW demand, last interval demand, load profile, voltage, voltage profile, logs of voltage sag and swell events, voltage event flags, phase information, outage counts, outage logs, tamper notification, power factor, and time-of-use kWh and Peak kW readings.

Furthermore, AMI can be used to influence utility customer behavior by providing customers with detailed, near real-time information about their energy usage, including when and how they are consuming electricity. AMI enables the implementation of demand response programs, which incentivize customers to lower their energy consumption during peak periods. For example, utilities can use AMI to implement time-of-use tariffs, which charge different rates for electricity based on the time of day and demand. This encourages customers to shift their usage to off-peak times when prices are lower, reducing overall peak demand. AMI data also allows utilities to provide customers with personalized energy-saving tips and alerts based on their specific usage patterns.

Figure 2:
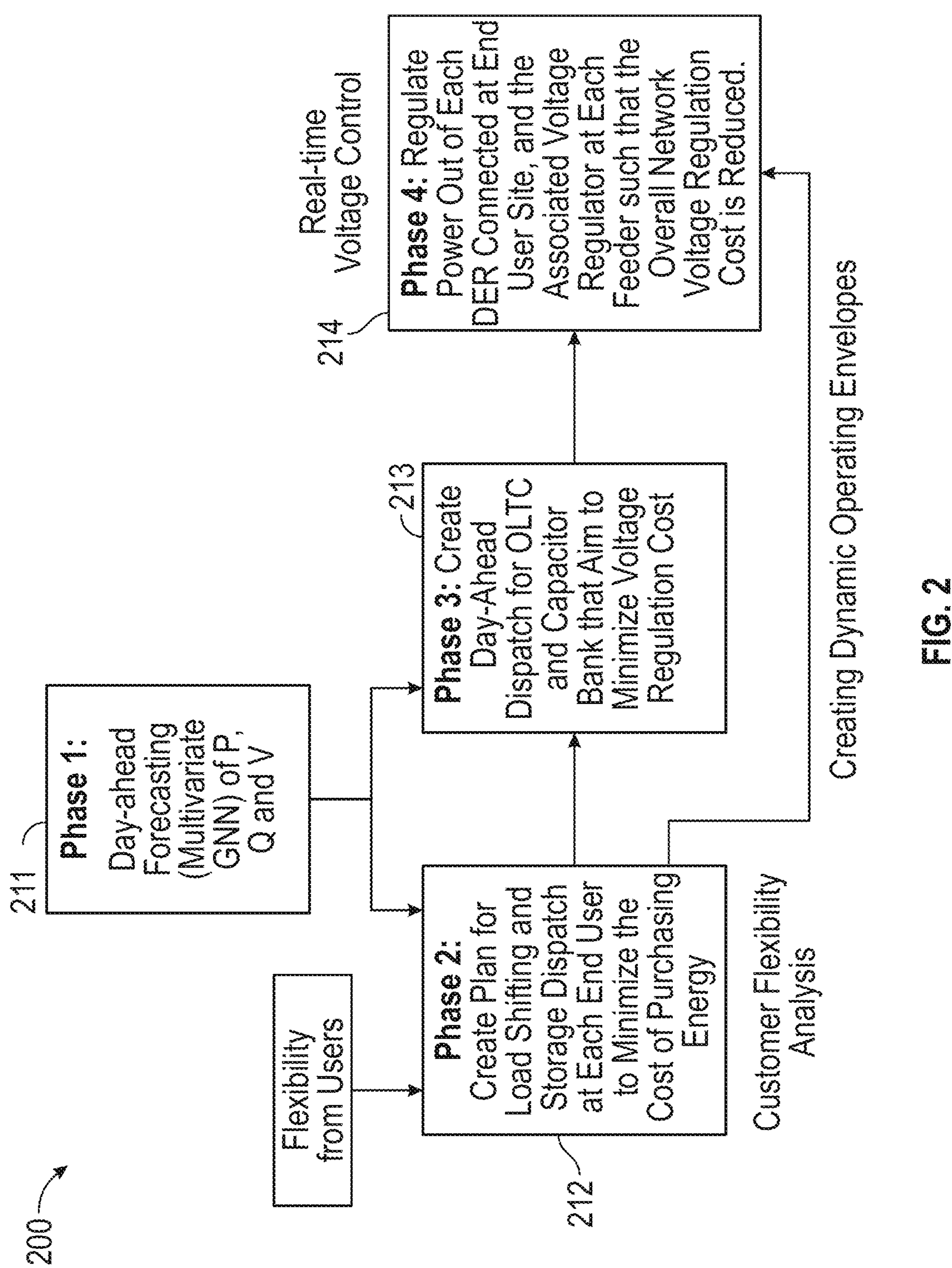
FIG. 2 is a flow diagram of a two-stage distributed voltage control method that is implemented by the system depicted in FIG. 1, in accordance with an exemplary embodiment of the disclosed concept.

FIG. 1 is a block depiction of a two-stage voltage control system 100 for a power distribution network, in accordance with an exemplary embodiment of the disclosed concept, and FIG. 2 is a flow diagram of a multi-phase voltage control method 200 for use in a power distribution network, in accordance with an exemplary embodiment of the disclosed concept. The two-stage voltage control system 100 (referred to hereinafter as the "voltage control system 100" for brevity) executes the phases of the multi-phase voltage control method 200 (referred to hereinafter as the "voltage control method 200" for brevity), and as such, the voltage control system 100 and voltage control method 200 are discussed in conjunction with one another herein.

The voltage control system 100 is a controller system that comprises a localized voltage control manager 101 and a distributed voltage control manager 102 in communication with one another. Although the localized voltage control manager 101 and the distributed voltage control manager 102 are depicted as two entities in FIG. 1, it is noted that the two voltage control managers 101, 102 can be implemented either in one controller or in multiple controllers in communication with one another without departing from the scope of the disclosed concept. It is important to note that most utility companies do not currently possess the complete network topology necessary to access comprehensive real-time network status of an entire power distribution network. The voltage control system 100 addresses this limitation by using end-user level data and information from secondary substations to effectively estimate the future network state based on limited observable network data. Secondary substations should be understood as being those substations that step down medium voltage to low voltage, with low voltage being voltage of a level suitable for local distribution to residential and commercial end users. The term "localized area" is used herein to refer to a portion of the utility grid that includes a secondary substation and all downstream entities.

As shown in FIG. 1, the voltage control system 100 is configured to communicate with a localized area 1. The localized area 1 comprises a secondary substation 2 that supplies power to a plurality of end users 4 via secondary feeders 6. The secondary substation 2 depicted in FIG. 1 should be understood to be a typical secondary substation 2 that is connected to multiple secondary feeders 6, with each secondary feeder 6 capable of supplying power to a plurality of end users 4. That is, the depiction of a single secondary feeder 6 in FIG. 1 is solely for the sake of simplicity, and it should be understood that when the voltage control system 100 is configured to communicate with the secondary substation 2, the voltage control system 100 receives information about all secondary feeders 6 connected to the substation 2 and their associated downstream end users 4.

Each of the end users 4 can have a number of DERs 7. Given that various laws and/or regulations require that an end user 4 obtain interconnection permission from the relevant utility prior to installing a DER 7 at the end user's premises, it is assumed that the voltage control system 100 can be provided with the information about each DER 7 in the localized area 1 prior to the voltage control system 100 being put into service. An advanced metering infrastructure (AMI) device 8 is associated with each end user 4. It will be appreciated that AMI devices 8 can be configured in various manners such that there does not necessarily need to be a one-to-one mapping of AMI devices 8 to end users 4, and it should be understood that the depiction of AMI devices 8 in FIG. 1 is a non-limiting illustrative example of how AMI can be used to gather data about consumption patterns of the end users 4. The localized voltage control manager 101 and distributed voltage control manager 102 are both configured to communicate with the secondary substation 2 and the plurality of AMI devices 8, as symbolically depicted in FIG. 1.

It will be appreciated that a utility's service area includes multiple localized areas, i.e. multiple instances of the localized area 1 shown in FIG. 1. As such, it should be noted that the voltage control system 100 is designed to be in communication with a plurality of localized areas 1 and that the localized voltage control manager 101 and the distributed voltage control manager 102 are configured to communicate with multiple secondary substations 2 and the downstream AMI devices 8 associated with those multiple secondary substations 2. For the sake of simplicity, only one localized area 1 is shown in FIG. 1 and the voltage control system 100 is described in conjunction with only the one localized area 1 shown, but it should be understood that the voltage control system 100 is designed to execute all functions described herein for all localized areas 1 with which the voltage control system 100 is in communication.

The localized voltage control manager 101 comprises an optimization model 103, and the distributed voltage control manager 102 comprises a graph neural network (GNN) model 104. The optimization model 103 and GNN model 104 are both trained machine learning models. The GNN model 104 incorporates principles from physics and utilizes graph neural networks to model the power grid's network structure. A GNN is a type of deep learning model designed to work with graph-structured data, and in the context of a power grid, the grid's infrastructure can be represented as a graph, with nodes representing secondary substations (e.g. the secondary substation 2 in FIG. 1) and end consumers (e.g. the end users 4 in FIG. 1), and edges representing feeders (e.g. the secondary feeder 6 in FIG. 1, as well as primary feeders upstream of the secondary substations 2). The use of the GNN model 104 enables the voltage control system 100 to capture the relationships and dependencies between different components of the power grid, by taking into account the inherent nature of the power grid while ensuring that the forecasted demands and voltage level align within grid constraints.

The optimization model 103 models the desired energy consumption of all end users 4 in the localized area 1 as a branched, multi-stage optimization problem where each sub-branch is a different model. Every end user I will have different optimization objectives for their energy consumption, such as, for example and without limitation: cost minimization through load shifting, leveraging the time-of-use tariff, minimizing the voltage regulation cost, or maximizing self-consumption (e.g. charging an EV to its full capacity). Thus, the optimization model 103 is configured to achieve the objectives of each individual end user 4 (i.e. the objectives of each individual end user 4 being a sub-branch and individual model of the branched, multi-stage optimization problem) and then combine all models to reach a global optimal plan at the feeder level.

Referring to FIGS. 1 and 2, it is noted that the localized voltage control manager 101 and the distributed voltage control manager 102 of FIG. 1 each include a plurality of modules, and each module is configured to execute a corresponding step of the voltage control method 200 of FIG. 2. For a given one of the aforementioned modules in the voltage control system 100 and the specific step of the voltage control method 200 that said module is configured to execute, said module and said method step are numbered with a reference number having the same last two digits, so that their correspondence to one another can be easily discerned. For certain modules in FIG. 1, the reference number of the module has a letter appended, because the corresponding step of the method 200 is relevant both to the localized control functions performed by the localized voltage control manager 101 and to the distributed control functions performed by the distributed voltage control manager 102. For example, step 211 of the method 200 is relevant to both the localized control function and the distributed control function, hence the localized voltage control manager 101 and the distributed voltage control manager 102 respectively include a Phase 1 module 111A and a Phase 1 module 111B corresponding to step 211.

The voltage control method 200 begins with step 211 (also referred to as Phase 1 in the figures). At step 211, the localized Phase 1 module 111A and the distribution Phase 1 module 111B generate a day-ahead (i.e. one day in advance) forecast of active power (P), reactive power (Q), and voltage (V) at transformers, feeders, and end-user connections. Specifically, this day-ahead PQV forecast is generated using the PQV data provided by each secondary substation 2 and using the data provided by the AMI devices 8 regarding consumption of the end users 4 up to the present point in time. This initial step of the voltage control method 200 captures the power distribution network's current state based on the limited available observable data provided by the AMI devices 8 and the secondary substation 2.

The voltage control method 200 proceeds from step 211 to step 212 (also referred to as Phase 2 in the figures), wherein a localized Phase 2 module 112 uses the optimization model 103 to create a plan for load shifting at each end user 4 to minimize the cost of purchasing energy, based on the data used at step 211 regarding end user consumption and based on the day-ahead forecast generated at step 211. The load shifting plan can additionally include a plan for energy storage dispatch, to the extent that the end user 4 has a DER 7 at their service address that can be employed to supply power. Hereinafter, when reference is made to the load shifting plan, it should be understood that energy storage dispatch can either be included or omitted from the load shifting plan, as not every end user 4 would be expected to have a DER 7 that can supply power. The optimization model 103 creates load shifting boundaries for each end user 4 that minimize voltage variation and the energy consumption cost based on the flexibility of the end user's usage patterns. Minimizing the cost of purchasing energy for a given end user 4 is achieved by minimizing the end user's consumption of utility energy by accounting for any stored energy dispatch options the end user 4 may have by way of any DERs 7. Some end users 4 may have more flexibility in when they can shift their loads, while others may have more rigid constraints due to their operational needs. The AMI devices 8 can be configured to enable each end user 4 to provide inputs to the voltage control system 100 regarding their load flexibility and desired usage of their DERs 7. Based on the inputs of each end user 4 regarding load flexibility and desired usage and the observed load pattern from the DERs 7 and their associated forecast generated at step 211, the localized Phase 2 module 112 schedules a multi-fold load-shifting plan that accounts for maintaining the network constraints with cost minimization. At step 212, the optimization model 103 employs the capabilities of machine learning to effectively estimate the future network state using limited observable network data, which serves as the foundation for creating optimal schedules to control voltage, taking into consideration the capacity and connectivity constraints of the distributed network.

At the distribution stage, the voltage control method 200 proceeds from step 212 to step 213 (also referred to as Phase 3 in the figures). At step 213, a distribution Phase 3 module 113 creates a day-ahead dispatch for distribution level voltage control devices (including on-load tap changers (OLTCs), capacitor banks (CBs), and PV inverters) that aim to minimize voltage regulation cost. The day-ahead dispatch prescribes parameters for how each of the distribution level voltage control devices should be operated. This day-ahead dispatch is created based on the PQV forecast generated at step 211 and based on the multi-fold load-shifting plan generated at step 212, integrating the flexible end user schedules, forecasted voltage levels, and load demands to formulate schedules for voltage control devices like PV inverters, OLTCs, and CBs. For example, the day-ahead dispatch will delineate the optimal tap settings for each OLTC across the distribution network to ensure voltage remains within desired bounds while minimizing costs. At step 213, in addition to creating the day-ahead dispatch, the distribution Phase 3 module 113 formulates real-time voltage regulation strategies to be used as necessary the following day by the distribution-level voltage control devices in the network, including PV inverters, OLTCs, and CBs. These real-time strategies are complementary to the day-ahead dispatch and specifically crafted to enable the power grid to adhere to the parameters of the day-ahead dispatch and further reduce voltage regulation costs in real-time. Reducing voltage regulation costs is achieved by minimizing voltage violations, such as those introduced by the use of DERs 7, for example and without limitation.

At the localized level, once the next day commences (the next day being the future time period for which steps 211-213 were executed), the voltage control method 200 proceeds from step 212 to step 214 (also referred to as Phase 4 in the figures), and at the distribution level, the voltage control method 200 proceeds from step 213 to step 214. At the local level at step 214, the load shifting plan formulated at step 212 for each of the end users 4 is executed by a localized Phase 4 module 114A. It is noted that there is a voluntary compliance component on the part of each end user 4 in executing the load shifting plan. Executing the load shifting plan includes the localized Phase 4 module 114A communicating the load shifting plan to the end user 4, so that the end user 4 can decide whether and how closely to follow the recommended plan. The AMI device 8 facilitates this communication. For example, and without limitation, an end user 4 can choose to receive alerts from their utility company via email or a mobile phone app as a benefit of having an AMI device 8 associated with their service address. In addition, it is assumed that a utility choosing to employ the voltage control system 100 would incentivize customers to comply with the load shifting plan using a demand response program and/or a time of use tariff.

At the distribution level at step 214, the distribution Phase 4 module 114B executes the day-ahead dispatch and real-time voltage control strategies formulated at step 213 to regulate voltage at each secondary feeder 6 to reduce overall network voltage regulation cost. In executing the real-time control strategy at the distribution level at step 214, the distribution Phase 4 module 114B leverages real-time data and current network conditions to dynamically adapt and fine-tune the operation of capacitance banks, OLTCs, and PV inverters as needed to adhere as closely as possible to the day-ahead dispatch.

Figure 3:
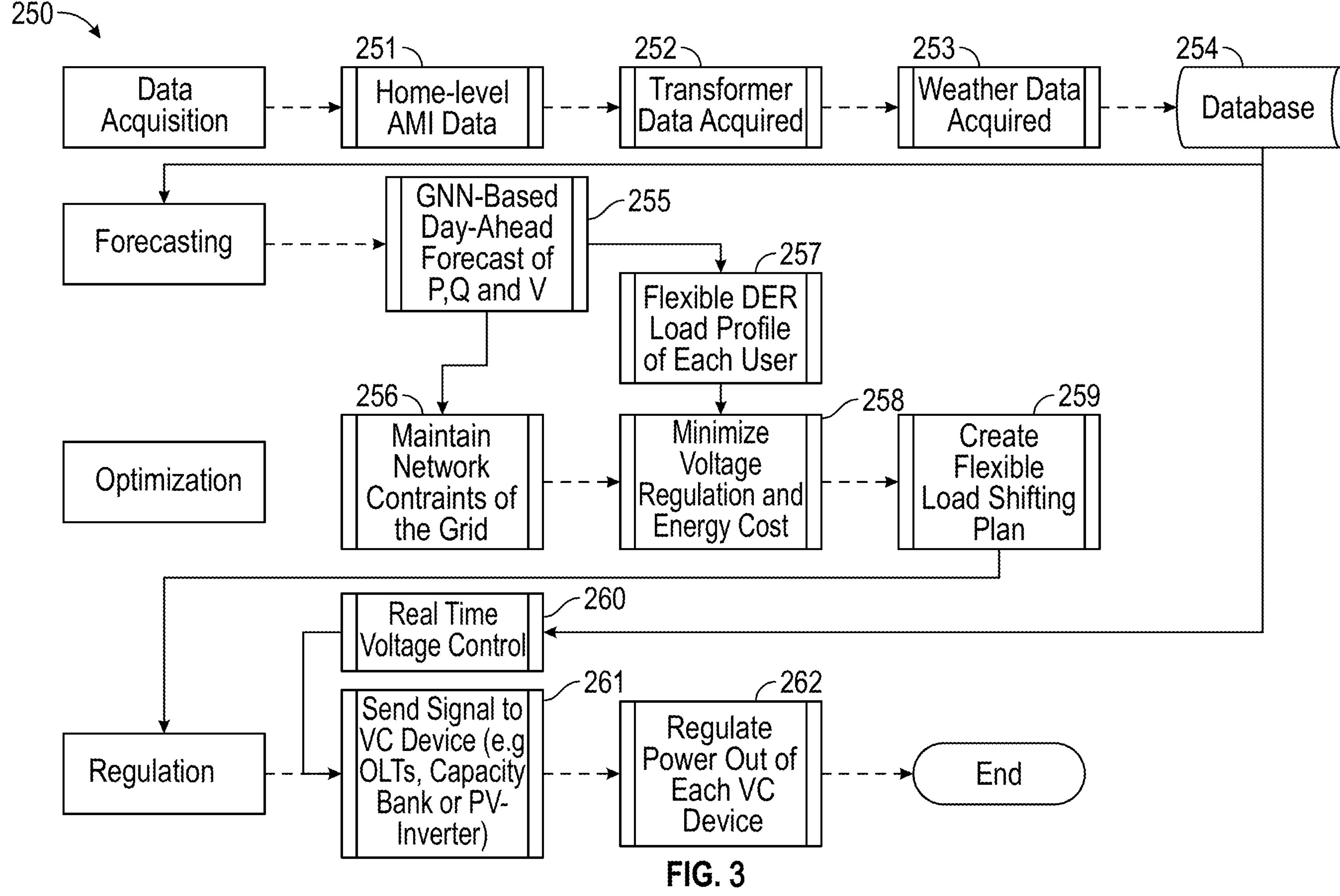
FIG. 3 is a flow diagram of data flow that occurs during the voltage control method of FIG. 2, in accordance with an exemplary embodiment of the disclosed concept.

FIG. 3 is a flow chart of data flow 250 that takes place during execution of the voltage control method 200, in accordance with an example embodiment of the disclosed concept. In order to generate the day-ahead PQV forecast at step 211, the voltage control system 100 performs data acquisition functions such as collecting home level AMI data 251 from the AMI devices 8 and transformer data (e.g. PQV data) from the secondary substation 2, as well as weather data 253. The voltage control system 100 stores the data 251-253 in a database 254, which the GNN model 104 can use to model the power distribution grid graphically. In addition, a flexible DER load profile 257 is created for each end user 4 based on data observed at the AMI devices 8 and user input to the AMI devices 8. Each flexible DER load profile 257 indicates where an end user 4 has flexibility to adjust energy consumption or generation in their use of their DER(s) 7.

In performing the optimization functions at step 212, the optimization model 103 considers a set of network constraints 256 of the grid in conjunction with the flexible DER load profiles 257, which is then used at step 213 to create the day-ahead dispatch 258 for the OLTCs and CBs, which aims to minimize voltage regulation and energy cost. The optimization model 103 also considers the network constraints 256 with the flexible DER load profiles 257 to create the flexible load shifting plan 259 at step 212. Once the optimization functions are completed, the real-time voltage control strategy 260 for the distribution side can be executed at step 214. Executing the real-time voltage control strategy 260 includes sending operation signals 261 to the various voltage control devices in the power distribution network (e.g. PV inverters, OLTCs, and CBs) to activate and adjust the voltage control devices according to the schedule created at step 213, as well as making adjustments 262 to the voltage control devices in real-time according to the real-time control strategy (formulated at step 213) when there are threshold-violating voltage fluctuations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A voltage control system for controlling voltage in a power distribution network having a localized area, the localized area comprising a secondary substation and a plurality of end users that receive power from the secondary substation via a plurality of secondary feeders, the localized area including AMI devices that track energy consumption of each end user in the plurality of end users, the voltage control system being a controller system and comprising:

a localized voltage control manager, the localized voltage control manager being configured to communicate with the secondary substation and the AMI devices; and a distributed voltage control manager, the distributed voltage control manager being configured to communicate with the secondary substation and the AMI devices, wherein the localized voltage control manager and distributed voltage control manager are configured obtain energy consumption data and PQV data from the secondary substation and the AMI devices, the energy consumption data reflecting actual past energy consumption of each end user in the localized area and the PQV data reflecting quantification of active power P, reactive power Q, and voltage V actually input to and output by the substation, wherein the localized voltage control manager and the distributed voltage control manager are configured to generate a day-ahead forecast using the energy consumption data and the PQV data, wherein the localized voltage control manager is configured to create a load shifting plan for each end user based on the energy consumption data and based on the day-ahead forecast, with the load shifting plan providing a load use schedule under which each end user can use various loads without creating voltage violations, wherein distributed voltage control manager is configured to create a day-ahead dispatch for distribution level voltage control devices based on the day-ahead forecast and the load shifting plan, the day-ahead dispatch being designed to minimize voltage fluctuations from utility-set voltage requirements for the power distribution network, the day-ahead dispatch also prescribing parameters for how each of the distribution level voltage control devices should be operated, and wherein, when the day-ahead dispatch is executed, the distributed voltage control manager is configured to dynamically adapt operation of the distribution level voltage control devices in order to adhere as closely as possible to the day-ahead dispatch, based on real-time data and current network conditions in the power distribution network.

2. The voltage control system of claim 1, wherein the distribution level voltage control devices include on-load tap changers and capacitor banks.

3. The voltage control system of claim 2, wherein the distribution level voltage control devices further include PV inverters.

4. The voltage control system of claim 1, wherein the energy consumption data and PQV data reflect each user in a subset of the plurality of end users having a number of DERs.

5. The voltage control system of claim 1, wherein the load shifting plan includes a storage dispatch plan directed to using at least one of the DERs as a power source.

6. The voltage control system of claim 1, wherein the localized voltage control manager comprises an optimization model that is a trained machine learning model.

7. The voltage control system of claim 6, wherein the optimization model is configured to model a desired power consumption of all of the end users as a branched multi-stage optimization problem, wherein the optimization model is configured to assume that each end user has energy consumption optimization objectives, wherein the optimization model is configured to treat the energy consumption optimization objectives of each individual end user as a sub-branch and individual model of the branched multi-stage optimization problem in order to achieve the energy consumption optimization objectives of each individual end user, and wherein the optimization model is configured to combine all of the individual models of the branched multi-stage optimization problem in order to produce a global optimal plan for those portions of the localized area located at the secondary feeders and downstream.

8. The voltage control system of claim 1, wherein the distributed voltage control manager comprises a GNN model that is a trained machine learning model.

9. The voltage control system of claim 8, wherein the GNN model is configured to represent infrastructure of the power distribution network as a graph, with nodes representing the secondary substations and the end users, and edges representing the secondary feeders.

10. The voltage control system of claim 9, wherein the GNN model is configured to additionally use edges to represent primary feeders upstream of the secondary substations.

11. A method for controlling voltage in a power distribution network having a localized area, the localized area comprising a secondary substation and a plurality of end users that receive power from the secondary substation via a plurality of secondary feeders, the localized area including AMI devices that track energy consumption of each end user in the plurality of end users, the method comprising:

providing a voltage control system that is a controller system, the voltage control system including a localized voltage control manager and a distributed voltage control manager, the localized voltage control manager and the distributed voltage control manager being configured to communicate with the secondary substation and the AMI devices;

obtaining, with the localized voltage control manager and distributed voltage control manager, energy consumption data and PQV data from the secondary substation and the AMI devices, the energy consumption data reflecting actual past energy consumption of each end user in the localized area and the PQV data reflecting quantification of active power P, reactive power Q, and voltage V actually input to and output by the substation;

generating, with the localized voltage control manager and the distributed voltage control manager, a day-ahead forecast using the energy consumption data and the PQV data;

generating, with the localized voltage control manager, a load shifting plan for each end user based on the energy consumption data and based on the day-ahead forecast, with the load shifting plan providing a load use schedule under which each end user can use various loads without creating voltage violations;

generating, with the distributed voltage control manager, a day-ahead dispatch for distribution level voltage control devices based on the day-ahead forecast and the load shifting plan, the day-ahead dispatch being designed to minimize voltage fluctuations from utility-set voltage requirements for the power distribution network, the day-ahead dispatch also prescribing parameters for how each of the distribution level voltage control devices should be operated;

executing the day-ahead dispatch with the distributed voltage control manager; and dynamically adapting, with the distributed voltage control manager, operation of the distribution level voltage control devices in order to adhere as closely as possible to the day-ahead dispatch, based on real-time data and current network conditions in the power distribution network.

12. The method of claim 11, wherein the distribution level voltage control devices include on-load tap changers and capacitor banks.

13. The method of claim 12, wherein the distribution level voltage control devices further include PV inverters.

14. The method of claim 11, wherein the energy consumption data and PQV data reflect each user in a subset of the plurality of end users having a number of DERs.

15. The method of claim 11, wherein the load shifting plan includes a storage dispatch plan directed to using at least one of the DERs as a power source.

16. The method of claim 11, wherein the localized voltage control manager comprises an optimization model that is a trained machine learning model.

17. The method of claim 16, wherein the optimization model is configured to model a desired power consumption of all of the end users as a branched multi-stage optimization problem, wherein the optimization model is configured to assume that each end user has energy consumption optimization objectives, wherein the optimization model is configured to treat the energy consumption optimization objectives of each individual end user as a sub-branch and individual model of the branched multi-stage optimization problem in order to achieve the energy consumption optimization objectives of each individual end user, and wherein the optimization model is configured to combine all of the individual models of the branched multi-stage optimization problem in order to produce a global optimal plan for those portions of the localized area located at the secondary feeders and downstream.

18. The method of claim 11, wherein the distributed voltage control manager comprises a GNN model that is a trained machine learning model.

19. The method of claim 18, wherein the GNN model is configured to represent infrastructure of the power distribution network as a graph, with nodes representing the secondary substations and the end users, and edges representing the secondary feeders.

20. The method of claim 19, wherein the GNN model is configured to additionally use edges to represent primary feeders upstream of the secondary substations.

* * * * *